(12) United States Patent
Staudenmaier et al.

(10) Patent No.: US 9,892,088 B2
(45) Date of Patent: Feb. 13, 2018

(54) DATA PROCESSING SYSTEM AND METHOD OF CONTROLLING ACCESS TO A SHARED MEMORY UNIT

(75) Inventors: Michael Staudenmaier, Munich (DE); Yossi Amon, Kiryat Tivon (IL); Vincent Aubineau, Gif sur Yvette (FR)

(73) Assignee: NXP USA, INC., Austin, TX (US)

( * ) Notice: Subject to any disclaimer, the term of this patent is extended or adjusted under 35 U.S.C. 154(b) by 416 days.

(21) Appl. No.: 14/358,049

(22) PCT Filed: Nov. 24, 2011

(86) PCT No.: PCT/IB2011/003128
§ 371 (c)(1),
(2), (4) Date: May 14, 2014

(87) PCT Pub. No.: WO2013/076522
PCT Pub. Date: May 30, 2013

(65) Prior Publication Data
US 2014/0289357 A1    Sep. 25, 2014

(51) Int. Cl.
*G06F 3/00*      (2006.01)
*G06F 5/00*      (2006.01)
(Continued)

(52) U.S. Cl.
CPC ...... *G06F 15/17331* (2013.01); *G06F 9/5083* (2013.01); *G06F 12/084* (2013.01)

(58) Field of Classification Search
None
See application file for complete search history.

(56) References Cited

U.S. PATENT DOCUMENTS

| | | |
|---|---|---|
| 4,953,103 A | 8/1990 | Suzuki |
| 6,535,523 B1 | 3/2003 | Karmi et al. |
| (Continued) | | |

OTHER PUBLICATIONS

Heithecker S et al "Traffic Shaping for an FPGA Based SDRAM Controller with Complex QoS Requirements", Design Automation Conference, 2005, Proceedings, 42nd Anaheim, CA, USA Jun. 13-17, 2005, Piscataway, NJ, USA, IEEE, US, Jun. 13, 2005, pp. 575-578.

(Continued)

*Primary Examiner* — Elias Mamo

(57) ABSTRACT

A data processing system comprising at least a memory unit, a first client connected to the memory unit, and a second client connected to the memory unit is proposed. The first client may comprise a first memory access unit and an information unit. The first memory access unit may read data from or write data to the memory unit at a first data rate. The information unit may update internal data correlating with a minimum required value of the first data rate. The second client may comprise a second memory access unit and a data rate limiting unit. The second memory access unit may read data from or write data to the memory unit at a second data rate. The data rate limiting unit may limit the second data rate in dependence on the internal data. The first memory access unit may, for example, read data packets sequentially from the memory unit, and the information unit may update the internal data at least per data packet. A method of controlling access to a shared memory unit is also proposed.

20 Claims, 3 Drawing Sheets

(51) Int. Cl.
G06F 15/173 (2006.01)
G06F 9/50 (2006.01)
G06F 12/084 (2016.01)

(56) References Cited

U.S. PATENT DOCUMENTS

| | | | |
|---|---|---|---|
| 6,873,654 B1 * | 3/2005 | Rackett | H04N 19/176 |
| | | | 375/240.03 |
| 7,697,496 B2 | 4/2010 | Jung | |
| 7,904,666 B2 | 3/2011 | Mochida et al. | |
| 8,626,504 B2 | 1/2014 | Radhakrishnan et al. | |
| 2005/0025361 A1 * | 2/2005 | Gadre | H04N 5/147 |
| | | | 382/181 |
| 2005/0100114 A1 * | 5/2005 | Satagopan | G06F 13/385 |
| | | | 375/295 |
| 2008/0068997 A1 * | 3/2008 | Krause | H04N 21/23406 |
| | | | 370/232 |
| 2009/0304082 A1 * | 12/2009 | Radhakrishnan | G06F 17/30787 |
| | | | 375/240.15 |
| 2011/0321112 A1 * | 12/2011 | Nagy | H04W 28/22 |
| | | | 725/118 |

OTHER PUBLICATIONS

International Search Report and Written Opinion Correlating to PCT/IB2011/003128 dated Jul. 24, 2012.

* cited by examiner

DATA PROCESSING SYSTEM AND METHOD OF CONTROLLING ACCESS TO A SHARED MEMORY UNIT

FIELD OF THE INVENTION

This invention relates to a data processing system and to a method of controlling access to a shared memory unit.

BACKGROUND OF THE INVENTION

Memory devices are used in all fields of data processing technology to store various kinds of data. A memory device may be shared among several clients. As the total data rate or bandwidth for transferring data to or from the memory device is limited, a scheme may be needed to control the access of each individual client to the memory device so as to avoid interference between simultaneous access attempts by different clients. Such scheme may be implemented by means of a memory arbiter. The arbiter receives memory access requests from the various clients and grants access to the memory device in accordance with some suitable rule. The rule may take into account criteria such as the time at which a particular request was generated, the amount of data to be transferred to or from the respective client and the urgency of the request. The memory arbiter, in response to a request received from one of the clients, may for example allocate a certain data rate or bandwidth for that particular client, and deallocate the reserved data rate or bandwidth in response to a signal from that client or in response to some other triggering event, for example upon completion of a task executed by that client.

A data rate is a number of transferred bits per second. A data rate is equivalent to a bandwidth of a signal used to transfer the data.

U.S. Pat. No. 4,953,103 (Suzuki) describes a page printer comprising a central processing unit (CPU), internal memories, and a direct memory access controller (DMAC) for transferring data to or from a memory at high speed without requiring intervention by the CPU. The CPU, DMAC, and memories are interconnected by a bus over which data can be transferred. During a direct memory access (DMA) operation the bus is controlled by the DMAC and cannot be used by the CPU. In order to ensure that the CPU is not disabled for extended periods of time by long DMA operations, the page printer comprises a DMA stopping circuit for stopping and restarting DMA transfers in response to certain interrupt request signals received by the CPU. Access of the DMAC to the bus is thus controlled directly by means of interrupt request signals.

SUMMARY OF THE INVENTION

The present invention provides a data processing system and a method as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
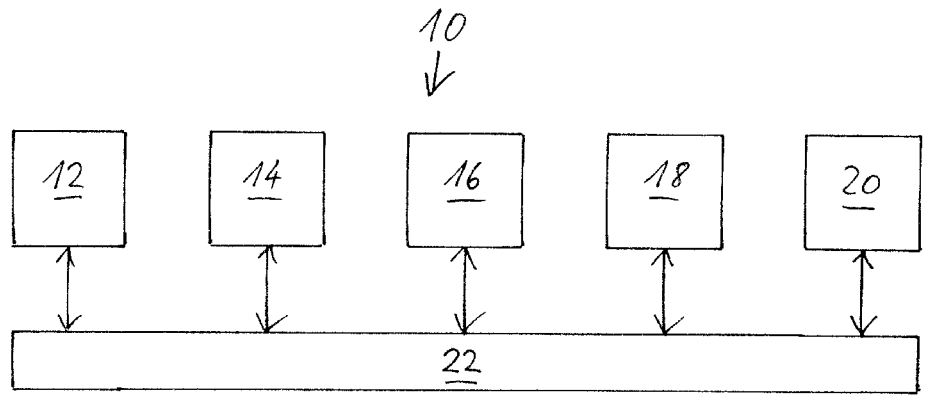
FIG. 1 schematically shows an example of an embodiment of a data processing system.

FIG. 1 illustrates an example of a data processing system 10. The shown data processing system 10 comprises a memory unit 12, an arbiter unit 14, a first client 16 and a second client 18. The data processing system 10 may further comprise a third client 20. It may comprise further clients (not shown). In the example, the memory unit 12, the arbiter unit 14 and the clients 16, 18, 20 are connected to a bus 22. Each of the clients 16, 18, 20 may be arranged to read data from or write data to the memory unit 12 via the bus 22.

The data processing system 10 may be arranged to operate for example as follows. Each of the clients 16, 18, 20 may issue requests for accessing the memory 12. Each request may for example specify a minimum value of a data rate required for the respective client. The requests issued by the clients 16, 18, 20 as well as allocation signals generated by the arbiter unit 14 may be transferred via the bus 22. The clients 16, 18, 20 may each read data from or write data to the memory unit 12 with a respective data rate which does not exceed the respective allocated maximum data rate. The first client 16, the second client 18 and the third client 20 may thus read data from or write data to the memory unit 12 at a first data rate, a second data rate and a third data rate, respectively.

If, for example, the entire available bandwidth has been allocated to the first client 16, the second data rate and the third data rate are zero. In this situation, only the first client 16 is allowed to access the memory unit 12. The data rate that is actually used by any one of the clients 16, 18, 20 may be lower than the data rate allocated to the respective client. This may notably occur if the respective client (for example the first client 16) is running an application in which the data rate for reading data from or writing data to the memory unit 12 varies. Such an application may for example include reading an audio stream from the memory unit 12 and reproducing sound encoded in the audio stream, the audio stream having a variable bit rate. Vorbis Ogg is an example of a variable bit rate audio format.

The data rate allocated to one of the clients (in the example, clients 16, 18 and 20) may, in principal, be adapted to the actual current data rate demand of the client in question by splitting tasks to be performed by the client into smaller tasks to be run successively, each task having associated with it a task-specific minimum required data rate. In practice, however, such splitting may be unfeasible, as it may require a significant additional effort at a hardware or software design stage. Furthermore, there may be a non-negligible delay between a client issuing a request and the arbiter unit 14 granting the request. This delay may depend on the design of the arbiter unit 14 and notably on the complexity of the decision process provided by the arbiter unit 14, but may be too long for real-time applications, in which case splitting the entire task into several sub-tasks to be run consecutively may not be an option. Examples of real-time applications include recording and reproducing audio and video as well as monitoring and controlling mechanical, electrical, optical or other devices, e.g. sensors in a motor vehicle.

Figure 2:
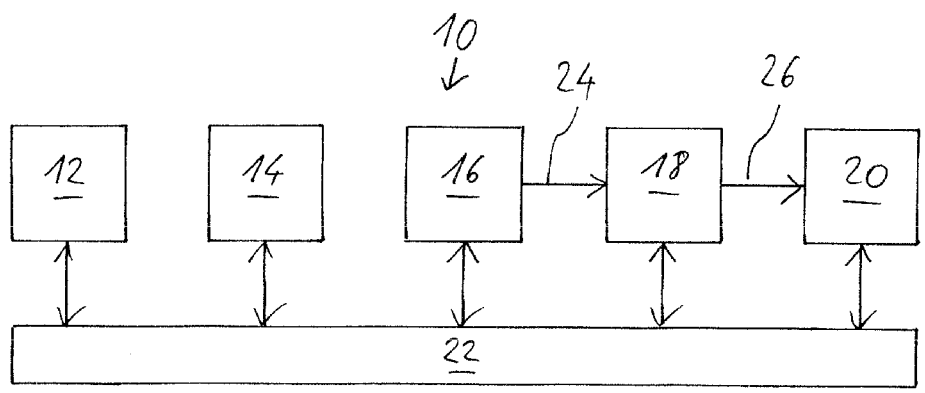
FIG. 2 schematically shows another example of an embodiment of a data processing system.

FIG. 2 illustrates another example of a data processing system 10. In the shown example, the data processing system 10 comprises, in addition to the components of the data processing system 10 shown in FIG. 1, additional circuitry for enabling the first client 16 to limit the data rate of data flow between the memory unit 12 and the second client 18 in dependence on internal data of the first client 16. To this end, the second client 18 may be directly connected to the first client 16 via a dedicated control line 24. For example, the control line 24 may be reserved for communication between the information unit 46 and the data rate limiting unit 48. The control line 24 may notably bypass the arbiter unit 14. The maximum data rate allowed for the second client 18 may thus be adapted rapidly in dependence on a minimum data rate required by the first client 16. This may allow the first client 16, for example, to read data from or write data to the memory unit 12 with a data rate higher than a maximum data rate allocated to the first client 16 by the arbiter unit 14. For example, in order to increase its own data rate, the first client 16 may throttle the data rate of the second client 18. The second client 18 may for example be a direct memory access (DMA) controller, and the start of a data transfer for a channel may be triggered by a throttling signal generated by client 16 and transmitted via the control line 24. In the shown example, the arbiter unit 14 is connected to the clients 16, 18, 20 via the bus 22. Alternatively, the arbiter unit 14 may be connected between the bus 22 and the memory unit 12.

In the shown example, the third client 20 is directly connected to the second client 18 via a second control line 26 in a way analogous to the connection of the second client 18 to the first client 16. The second client 18 is thus arranged to perform real-time control of the third client 20 so as to limit the maximum allowed data rate of data flow between the memory unit 12 and the third client 20. The second client 18 may notably be arranged to throttle the data rate of the third client 20 in dependence on a data rate required by the first client 16 and a data rate required by the second client 18.

In the shown example, the additional data rate control via the control lines 24 and 26 may be supplementary to the basic data rate control provided by the arbiter unit 14.

In another example, only the second client 18 and the third client 20 are arranged to send memory access requests to the arbiter unit 14, and the first client 16 is arranged to access the memory unit 12 in an autonomous manner. In other words, the first client 16 may be arranged to read data from or write data to the memory unit 12 at any time and with any data rate supported by the hardware and to throttle the data rates of the other clients connected to the memory unit 12 (in the example, clients 18 and 20) accordingly.

In yet another example, the arbiter unit 14 is omitted and access of any clients connected to the memory unit 12 is controlled exclusively via inter-client control lines, such as control lines 24 and 26 in the shown example. "Control" in this respect may include data rate throttling. The clients may be interconnected in a chain like manner, as shown in FIG. 2, wherein a first client (client 16 in the example) is arranged to control a second client (e.g. client 18) which in turn is arranged to control a third client (e.g. client 20), and so on.

Alternatively, a first client may be arranged to control directly every other client. The first client may notably be a time critical client, e.g. the most time critical client among all clients connected to the memory unit 12. It may thus be ensured that the highest possible data rate supported by the hardware is available to the most time critical client at any time.

Figure 3:
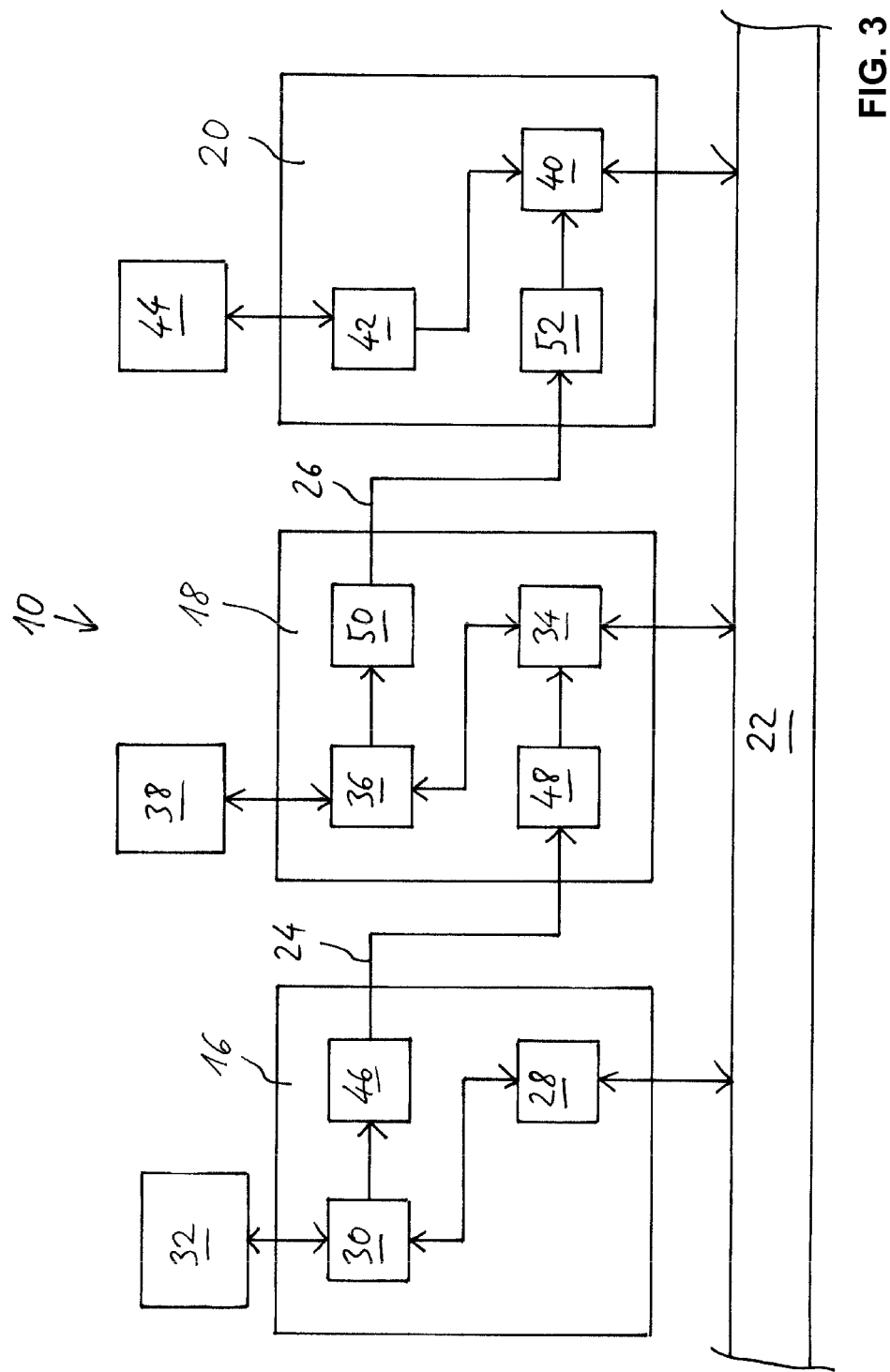
FIG. 3 schematically shows an example of an embodiment of three clients connected to a memory unit.

An example of the data processing system 10 described above in reference to FIG. 2 is described in greater detail further with additional reference to FIG. 3. In the shown example, each of the clients 16, 18, 20 may comprise a memory access unit (28, 34, 40, respectively) for reading data from or writing data to the memory unit 12 via the bus 22. For example, each of the memory access units 28, 34, 40 may be arranged to generate address signals for specifying a particular memory location within the memory unit 12 from which data is to be read or to which data is to be written. Each of the memory address units 28, 34, 40 may further be arranged to indicate whether data is to be read from or written to the memory unit 12. Each of the clients 16, 18, 20 may further comprise a control unit 30, 36, 42 connected to the respective memory access unit 28, 34, 40. The control units 30, 36, 42 may be arranged each to control the corresponding memory access unit 28, 34 or 40 and to receive data from or send data to the respective memory access unit 28, 34, 40. The bus 22 together with the memory access units 28, 34, 40 thus provides an interface between the memory unit 12 and the control units 30, 36, 42.

In the shown example, an external device 32, 38, 44 may be connected to each of the clients 16, 18, 20. Each of the external devices 32, 38, 44 may for example comprise an input device, an output device, or a combination thereof. Examples of input devices and output devices include audio devices, video devices, telecommunication devices as well as electronic sensors. For example, the external devices 32, 38, 44 may be an electronic display, a transceiver unit for communication within a wireless telephone network, and a fuel sensor, respectively.

In the example, the first client 16 may be a low latency client in the sense that it needs to read data from or write data to the memory unit 12 via the bus 22 in real-time or in near real-time, that is, with short delays. The delay may, for example, be shorter than a single clock cycle of the first client. The memory access unit 28 of the first client 16 may therefore be allocated a sufficiently high data rate for data transfer to or from the memory unit 12. This data rate may be a fixed data rate determined entirely by the hardware independently of any arbiter unit, or it may be allocated by e.g. an arbiter unit such as the arbiter unit 14 shown in FIG. 2. It is recalled that the data processing system 10 may or may not comprise an arbiter unit.

In the present example, the first client 16 may comprise an information unit 46 arranged to update internal data of the first client 16, the internal data correlating with a minimum data rate required by the first client 16. The information unit 46 may for example be arranged to update the internal data in accordance with a process flow indicated by the control unit 30.

In this example, the second client 18 may further comprise a data rate limiting unit 48 arranged to limit the data rate of data flow between the memory unit 12 and the memory access unit 34 of the second client 18. The data rate limiting unit 48 may be connected to the information unit 46 of the first client 16 via the control line 24. The data rate limiting unit 48 may thus respond to any change in the internal data provided by the information unit 46 by controlling the memory access unit 34 accordingly.

The data rate limiting unit 48 may, for instance, limit the second client's data rate by throttling this second data rate, or by postponing or canceling tasks to be performed by the second client 18, or by setting a maximum allowed packet size for data packets to be transferred between the second memory access unit 34 and the memory unit 12. For example, the data rate limiting unit 48 may increase a maximum data rate allowed for the memory access unit 34 in response to the internal data correlating with a decrease of the data rate allowed for the memory access unit 28 of the first client 16. Similarly, the data rate limiting unit 48 may reduce the maximum allowed data rate for the second client in response to the internal data provided by the information unit 46 correlating with an increase of the data rate required by the first client 16.

The first client may comprise one or more buffers (not shown). The internal data may in this case indicate, for at least one of the buffers, a fill level of the respective buffer. The internal data may, for instance, include a buffer status field indicating the status of, e.g., a frame buffer, such as video or audio frame buffer. The status field may for instance indicate a current buffer fill level. The buffer fill level may provide a measure of an extent to which e.g. a video frame has been loaded to the buffer. Alternatively or in addition, the internal data may contain a field indicating a current pixel of a screen. For instance, pixel state information may be loaded sequentially for all pixels of the screen, pixel by pixel, and the current pixel may be the particular pixel for which the pixel state information is to be loaded next.

Alternatively or in addition, the internal data may for example indicate, explicitly or implicitly, the minimum data rate required by the first client 16 to a certain degree of precision. In a simple example, the internal data may consist of only a single bit. A first value, for example ZERO, of this data bit, for example ONE, may for example indicate that the data rate required by the first client 16 is zero, and a second value of the information bit may indicate that the data rate required by the first client 16 is nonzero. In this case, the data rate limiting unit 48 may for example be arranged to allow the memory access unit 34 of the second client 18 to access the memory unit 12 without any data rate restriction when the data bit indicates the first value (e.g. ZERO) and to prevent any data flow between the memory unit 12 and the memory access unit 34 when the data bit indicates the second value (e.g. ONE). Alternatively, the internal data provided by the information unit 46 may consist of more than one bit, for example of eight bits (1 byte), and the data rate limiting unit 48 may be arranged to limit the data rate for the second client 18 in a gradual manner. The data rate limiting unit 48 may for example control the memory access unit 34 such that the sum of the data rate required for the first client (e.g. as indicated by the information unit 46) and the maximum data rate allowed for the second client (e.g. as set by the data rate limiting unit 48) equals a predefined maximum total data rate.

The internal data provided by the information unit 46 may explicitly indicate the data rate required by the first client 16, for example, in the form of a digital number. Alternatively, the internal data may consist of other data correlating with the minimum required data rate of the first client 16. Such data may include, for example, internal operating data of the control unit 30. Internal operating data may for example include scheduling information indicating when a next transfer of data between the memory unit 12 and the first client 16 will be required. This scheduling information may indicate, for example, a maximum latency that is acceptable for the first client 16. Internal operating data may also consist of or include, for example, a fill level of an internal buffer, or a predicted bandwidth. Internal operating data may also include additional data that hints towards timeslots where other clients are allowed to access the memory unit 12. A final throttling information data set may be generated on the basis of one or more of these or other factors, for instance in accordance with a mathematical formula or using an algorithm. The algorithm may, for instance, include a weighting algorithm for weighting the individual factors.

The control unit 30 may for example comprise a micro processor. The internal data may in this case comprise a program counter (PC). The program counter, also called the instruction pointer, may be a processor register that indicates where the processor is in its instruction sequence. Each instruction to be executed by the control unit 30 and, equivalently, each possible value of the program counter may be associated with a particular data rate value for data flow between the memory unit 12 and the memory access unit 28.

Alternatively or additionally one or more internal status bits or other kind of status information may be included in the internal data provided by the information unit 46. The information unit 46 may for example be arranged to select a subset of status bits of the control unit 30 and to provide the selected subset of status bits to the data rate limiting unit 48 via the control line 24. The selected subset of status bits may thus be included in the internal data.

Alternatively or in addition, the internal data may indicate or correlate with a maximum acceptable latency of the first client 16. In this context, latency is the time the first client may have to wait before being able to access the memory unit 12. Latency may correlate with the length of a memory access by another client, e.g. the second client 18. Latency may depend on, for example, a maximum burst size used by, e.g., the second client 18, or on the packet length transferred in a single shot by the second client 18.

Figure 5:
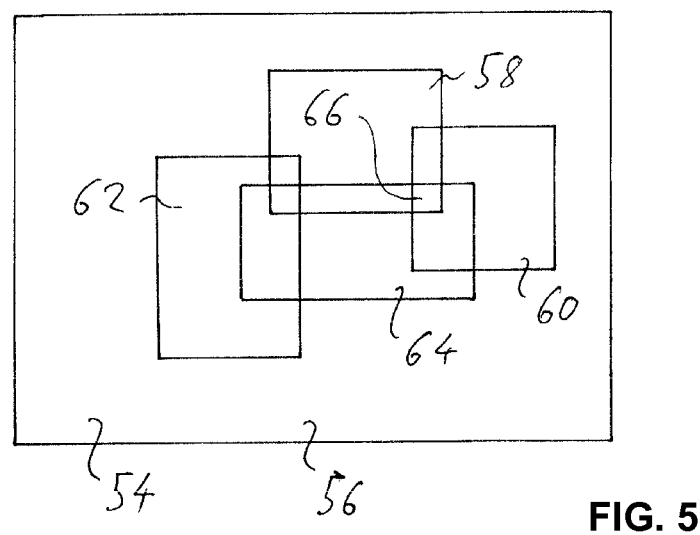
FIG. 5 schematically shows an example of a view of an electronic display.

For example, the internal data may include a fill level of a buffer of the first client 16. As mentioned above, the buffer may for example be a video frame buffer. The buffer may serve, for instance, to buffer data that is pre-fetched from the memory unit 12. The pre-fetched data may, for example, contain data for pixels to be displayed next. The buffers fill level may correlate with a maximum latency that is acceptable for a next memory access operation to succeed. The higher the fill level, the less data may remain to be fetched within a remaining lapse of time. The maximum latency that is acceptable for the first client 16 may thus increase as the fill level increases. Accordingly, a higher data rate or larger data packets may be allowed for, e.g., the second client 18. It is noted that the first client 16 may comprise several buffers for buffering pre-fetched data. In this case, the internal data may include the fill levels of several buffers, e.g. two, three or more fill levels. The buffer fill levels may be evaluated, for example, in conjunction with data indicating the positions of the pixels that are to be displayed next (cf. FIG. 5 and the corresponding description), to predict a data rate required by the first client 16.

In the shown example, the second client 18 may further comprise an information unit 50 for providing internal data that correlates with a minimum data rate required by the second client 18 for data transfer between the memory unit 12 and the memory access unit 34. The third client 20 may further comprise a data rate limiting unit 52 connected to the information unit 50 of the second client 18. The components 46, 24 and 48 may be similar to the components 50, 26 and 52, respectively. The description of the units 46, 24 and 48 can thus be applied to the units 50, 26 and 52, and vice versa. The information unit 50 and the data rate limiting unit 52 may thus be operable to limit the data rate of data flow between the memory unit 12 and the memory access unit 40 of the third client in dependence on the internal data provided by the information unit 50. The internal data provided by the information unit 50 may for instance correlate with a data rate of a combined data flow between the memory unit 12 and the first and second clients 16 and 18. The data rate limiting unit 52 may be arranged to limit the data rate of data flow between the memory unit 12 and the third client 20 such that the combined data rate of the three clients 16, 18 and 20 does not exceed a maximum allowable data rate.

The scheme described above may of course be extended to more than three clients.

In an example, the first memory access unit 28 may read data packets sequentially from the memory unit 12. The information unit 46 may update the internal data at least once per data packet. The information unit 46 may, for example, update the internal data on the basis of a size of the respective data packet or on the basis of a bit-rate associated with the respective data packet. The data rate limiting unit 48 may notable adjust an upper limit of the second data rate at least once per data packet. The data packets may form an audio or video stream, for example. The first client 16 may for instance generate video frames sequentially. The first memory access unit may read the data packets at least once per frame. The first client 16 may generate the frames, for example, by determining pixel states, e.g. for each pixel group among a set of pixel groups of a screen. The first memory access unit 28 may read at least one data packet per pixel group. Each pixel group may, for instance, be a single pixel or a line of pixels. The data packets to be read for a respective pixel group may comprise, for example, image data from none, one, or more digital images. The total number of these digital images may depend on the respective pixel group.

Figure 4:
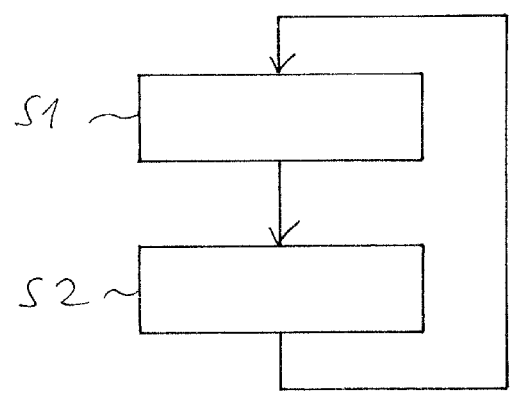
FIG. 4 shows a flow chart of an example of an embodiment of a method of controlling access to a shared memory unit.

A possible mode of operation of the data processing system 10 of FIG. 2 or 3 is described by making additional reference to FIG. 4. In the shown process, the memory access unit 28 of the first client 16 and the memory access unit 34 of the second client 18 may read data from or write data to the shared memory unit 12 at a first and second data rate, respectively. The information unit 46 of the first client 16 may update internal data which correlates with a minimum required value of the first data rate (block S1). The information unit 46 may for example update the internal data during a task performed by the control unit 30 of the first client 16. The internal data may thus be updated rapidly, for example, in real-time, so as to reflect rapid variations of the minimum required value of the first data rate. The data rate limiting unit 48 of the second client 18 may respond by limiting the second data rate in dependence on the internal data (block S2). The process flow may then return to block S1. Blocks S1 and S2 may thus be repeated.

For instance, in a scenario in which the external device 32 is a video output unit, blocks S1 and S2 may be performed several times during each video frame of, for example, a succession of video frames of a video movie. The second data rate may thus be throttled, for example, in dependence on which region among several regions of a video display of the external device 32 is currently dealt with by the control unit 30. For example, an image to be displayed on the video display may comprise several regions of different graphical complexity. Regions containing more complex graphical content may require more digital data to be read from the memory unit 12 during a limited amount of time, and may thus require a higher data rate for the memory access unit 28 to retrieve that data from the memory unit 12. On the other hand, other regions of the image may require little or no data to be read from the memory unit 12, and a reduced data rate for the memory access unit 28 may thus be sufficient for these regions. For example, one or more regions may contain no graphical content except a uniform background colour, for instance black. The data rate limiting unit 48 of the second client 18 may thus limit the data rate for the second client 18 in dependence on the current image region that is about to be processed by the first client 16.

For example, an image 54 (see FIG. 5) which is to be generated by, for example, the external device 32, may comprise several regions. At least some of the regions may overlap. In the shown example, the image 54 comprises five regions 56, 58, 60, 62 and 64. In the example, region 56 may be a background region covering the entire image 54. The image 54 may be composed of pixels. Each pixel may be part of one or more regions. In the example, each pixel is at least part of the background region 56, while some pixels are additionally part of at least one of the other regions 58, 60, 62 and 64. In the shown example, the regions 58, 60, 62 and 64 do partly overlap. For example, there is a region 66 in which the regions 58, 60 and 64 overlap.

The client 16, or its control unit 30, may for example be a device commonly referred to as a display controller. The control unit 30 (see again FIG. 3) may be arranged to compute the state of each pixel, e.g. colour and brightness, on the basis of data retrieved from e.g. the memory unit 12 via the memory access unit 28. To this end, the memory access unit 28 may for example retrieve image data from the memory unit 12 via the bus 22 successively for all pixels of the image 54, e.g. pixel by pixel. For pixels belonging only to the background region 56 the memory access unit 28 may have to read only a background colour and background brightness, for example. For pixels belonging to more than one region, for instance, for pixels inside the region 62, the memory access unit 28 may read image data associated with each of the regions that comprise the pixel in question. The control unit 30 may then combine the data of these regions to compute the pixel state of the respective pixel. For instance, each of the regions 56, 58, 60, 62, 64 and 66 may contain a particular image, and the control unit 30 may compute the state of each pixel of the image 54 by overlaying, superimposing, or otherwise combining the images of all those regions that contain the pixel in question.

The amount of data to be read for each pixel may thus vary from pixel to pixel. For example, more data may need to be retrieved from the memory unit 12 for pixels in the overlapping region 66 as compared, for example, to pixels which do not belong to any one of the regions 58, 60, 62 and 64. The control unit 30 may be arranged to compute the state of each pixel during a time slot having a fixed length. In this context, computing the pixel state may comprise retrieving the required image data from the memory unit 12. The time available for each pixel being fixed, the memory access unit 28 may retrieve this data using a data rate adapted to the amount of the data to be fetched. The memory access unit 28 may thus use a lower data rate to retrieve data for pixels which require relatively small amounts of data and increase the data rate for pixels which require more data. The information unit 46 may adapt the internal data provided to the data rate limiting unit 48 accordingly and thus enable the second client 18 to adapt its data rate accordingly.

In the present example, the required data rate may be easily predicted by e.g. the control unit 30. More accurate throttling information may thus be provided. For instance, if the control unit 30 predicts the required data rate to drop soon, it can grant a higher bandwidth to the other clients.

It is pointed out that a data rate associated with data flow between, e.g., the second client 18 and the memory unit 12, may be limited in a number of different ways. The data rate may, for instance, be limited indirectly by preventing the respective client, e.g. the second client 18, from initiating data transfers that are expected to last a period exceeding a maximum allowed period. For example, the second client's data rate limiting unit 48 may ensure that the memory access unit 34 does not start sending oversized data packets to the memory unit 12 when the information unit 46 indicates that a fill level of a video frame buffer of the first client is within a certain range. An oversized data packet may be a data packet having a size that exceeds a defined maximum allowable size. The maximum allowable size may for instance be between 1 kilobyte and 1 Megabyte, depending on the system. In a related example, the information unit 46 does not indicate a buffer fill level, but directly a maximum allowed packet size. The information unit 46 may adapt the maximum allowed packet size in dependence on, e.g., the buffer fill level.

In the foregoing specification, the invention has been described with reference to specific examples of embodiments of the invention. It will, however, be evident that various modifications and changes may be made therein without departing from the broader spirit and scope of the invention as set forth in the appended claims.

A clock cycle is the inverse of a clock rate of a clock signal. The clock rate may be the number of triggering edges of the clock signal per second. Triggering edges may be only rising edges or only falling edges or both rising and falling edges of the clock signal.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, each of the clients 16, 18, and 20 may be connected to the memory unit 12 via a separate data bus instead of the shared data bus 22. Furthermore, the external devices 32, 38, and 44 may be integrated in the clients 16, 18, 20.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, external unit 32 and client 16 may be integrated as a single integrated circuit or within a same device. Similarly, external unit 38 and client 18 may be integrated as a single integrated circuit or within a same device. Alternatively, the examples may be implemented as any number of separate integrated circuits or separate devices interconnected with each other in a suitable manner. For example, control unit 30, memory access unit 28, and information unit 46 may be implemented as separate integrated circuits or as a single integrated circuit having the same functionality.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A data processor comprising a memory, a first client connected to said memory, and a second client connected to said memory,
   said first client comprising first memory access circuitry and information circuitry, said first memory access circuitry arranged to read data from or write data to said memory at a first data rate, said information circuitry arranged to update internal data correlating with a minimum required value of said first data rate,
   said second client comprising a second memory access circuitry and a data rate limiting circuitry, said second memory access circuitry arranged to read data from or write data to said memory at a second data rate, said data rate limiting circuitry arranged to limit said second data rate in dependence on said internal data identifying the minimum required value of said first data rate.

2. The data processing system of claim 1, said first client comprising one or more buffers, said internal data indicating, for at least one of said buffers, a fill level of the respective buffer.

3. The data processing system of claim 1, said first memory access circuitry being arranged to read data packets sequentially from said memory circuitry, said information circuitry being arranged to update said internal data at least once per data packet.

4. The data processing system of claim 3, said information circuitry being arranged to update said internal data on the basis of a size of the respective data packet or on the basis of a bit-rate associated with the respective data packet.

5. The data processing system of claim 3, said data rate limiting circuitry being arranged to adjust an upper limit of said second data rate at least once per data packet.

6. The data processing system of claim 3, said data packets forming an audio or video stream.

7. The data processing system of claim 3, said first client being arranged to generate video frames sequentially, said first memory access circuitry being arranged to read at least one of said data packets per frame.

8. The data processing system of claim 7, said first client being arranged to generate said frames by determining pixel states for each pixel group among a set of pixel groups of a screen, said first memory access circuitry being arranged to read at least one of said data packets per pixel group.

9. The data processing system of claim 8, each pixel group being a single pixel or a line of pixels.

10. The data processing system of claim 8, said data packets to be read for a respective pixel group comprising image data from none, one, or more digital images, the number of said digital images depending on the respective pixel group.

11. The data processing system of claim 1, said data rate limiting circuitry being arranged to limit said second data rate by throttling said second data rate, or by postponing or canceling tasks to be performed by said second client, or by setting a maximum allowed packet size for data packets to be transferred between said second memory access circuitry and said memory.

12. The data processing system of claim 1, said data rate limiting circuitry being connected to said information circuitry via a control line, said control line being reserved for communication between said information circuitry and said data rate limiting circuitry.

13. The data processing system of claim 1, further comprising arbiter circuitry arranged to receive memory access requests from at least said second client and to grant access to said memory on the basis of said memory access requests, said data rate limiting circuitry being connected to said information unit via a control line which bypasses said arbiter unit.

14. The data processing system of claim 1, comprising a third client connected to said memory,
   said second client comprising a second information circuitry arranged to update second internal data correlating with a minimum required value of said second data rate,
   said third client comprising a third memory access circuitry and a second data rate limiting circuitry, said third memory access circuitry arranged to read data from or write data to said memory at a third data rate, said second data rate limiting circuitry arranged to limit said third data rate in dependence on said second internal data.

15. A method of controlling access to a shared memory, said memory being shared among at least a first client and a second client, said method comprising:
   operating said first client to read data from or write data to said memory at a first data rate and to update internal data correlating with a minimum required value of said first data rate; and
   operating said second client to read data from or write data to said memory at a second data rate and to limit said second data rate in dependence on said internal data identifying the minimum required value of said first data rate.

16. The method of claim 15, further comprising:
reading, by the first client, data packets sequentially from said memory unit, said information unit being arranged to update said internal data at least once per data packet.

17. The method of claim 16, further comprising:
generating, by the first client, video frames sequentially; and
reading at least one of said data packets per frame.

18. The method of claim 17, further comprising:
generating said frames by determining pixel states for each pixel group among a set of pixel groups of a screen; and
reading at least one of said data packets per pixel group.

19. The method of claim 18, further comprising:
reading said data packets for a respective pixel group comprising image data from none, one, or more digital images, the number of said digital images depending on the respective pixel group.

20. A data processing system comprising:
a memory:
a first client connected to the memory, the first client being arranged to generate frames by determining pixel states for each pixel group among a set of pixel groups of a screen, the first client comprising:
   first memory access circuitry arranged to read data from or write data to the memory at a first data rate, and to read a data packet per pixel group; and
   information circuitry arranged to update internal data correlating with a minimum required value of the first data rate, the data packets to be read for a respective pixel group comprising image data from none, one, or more digital images, the number of the digital images depending on the respective pixel group; and
a second client connected to the memory, the second client comprising:

second memory access circuitry arranged to read data from or write data to the memory unit at a second data rate; and second data rate limiting circuitry arranged to limit the second data rate in dependence on the internal data.

* * * * *